United States Patent

Yeh et al.

Patent Number: 5,180,025
Date of Patent: Jan. 19, 1993

[54] WHEELED-CHAIR CHASSIS WITH A SUSPENSION MECHANISM

[76] Inventors: Bean-Shung Yeh; Wu-Yaw Wei; Bean-Horng Su; Lin-Yun Wu, all of 195,sec.4 chung Hsing Rd. chutung, Hsinchu, Taiwan, 31015

[21] Appl. No.: 808,216

[22] Filed: Dec. 13, 1991

[51] Int. Cl.⁵ .............................................. B60K 1/00
[52] U.S. Cl. ..................................... 180/65.5; 180/60; 180/65.6; 180/299; 180/371; 180/312; 180/907; 280/690; 280/701
[58] Field of Search ............... 180/65.6, 907, 65.5, 180/60, 299, 56, 312, 371; 280/701, 690, 788

[56] References Cited

U.S. PATENT DOCUMENTS

| | | | |
|---|---|---|---|
| 2,039,513 | 5/1936 | Baker | 180/65.5 |
| 4,436,320 | 3/1984 | Brudermann et al. | 180/907 |
| 4,455,031 | 6/1984 | Hosaka | 180/907 |
| 4,967,864 | 11/1990 | Boyer et al. | 180/907 |
| 5,022,476 | 6/1991 | Weege | 180/907 |

FOREIGN PATENT DOCUMENTS

| | | | |
|---|---|---|---|
| 339500 | 11/1989 | European Pat. Off. | 180/907 |
| 2549434 | 1/1985 | France | 180/312 |

Primary Examiner—Eric D. Culbreth
Attorney, Agent, or Firm—W. Wayne Liauh

[57] ABSTRACT

A wheeled-chair chassis with a suspension mechanism which comprises a chassis structure, a suspension system, a transmission system and two front and rear wheels; the chassis structure includes a steel pipe frame similar to an inverse triangular frame. The suspension system includes shock absorbers, rocker arms, and pivot pins; one end of the rocker arm is connected with a pivot base on lower end of the steel pipe frame by means of a pin, while the other end thereof is mounted with a gear rack for mounting a motor of the transmission system, a gear box, and the rear wheels. The shock absorber is fixedly mounted between the steel pipe frame and the rocker arm to provide a retractable movement for absorbing a shake from the rear wheels and the rocker arm caused by a rough road surface in order to provide the chair with a comfortable driving. Since each of the systems is an independent assembly, it is easy to assemble.

1 Claim, 5 Drawing Sheets

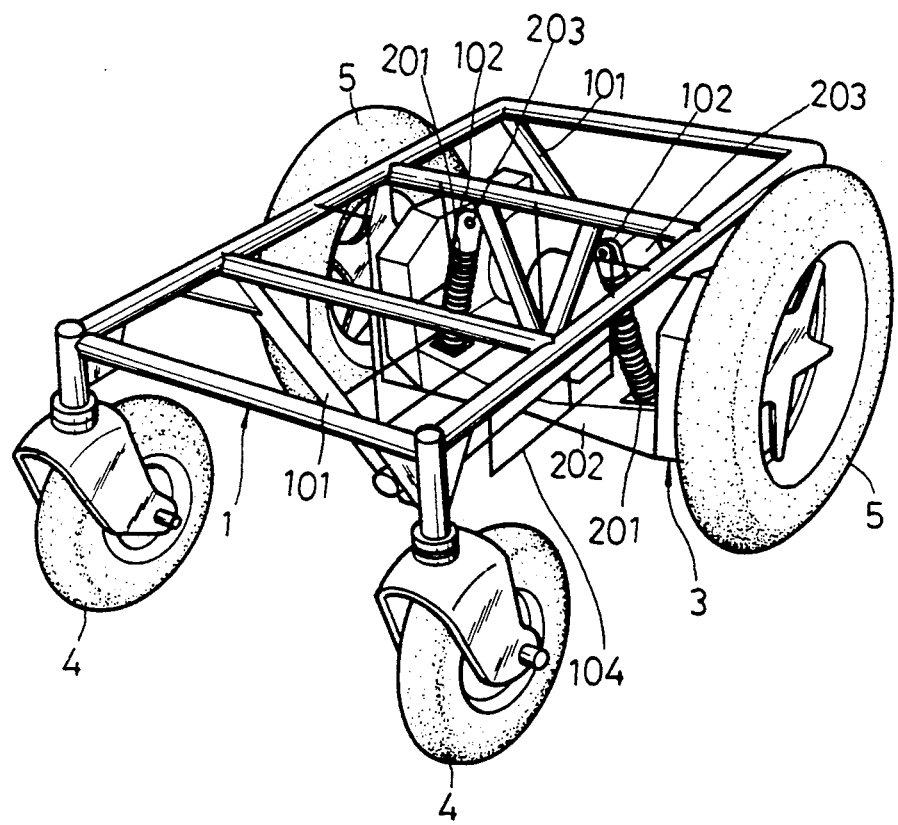
F I G. 4
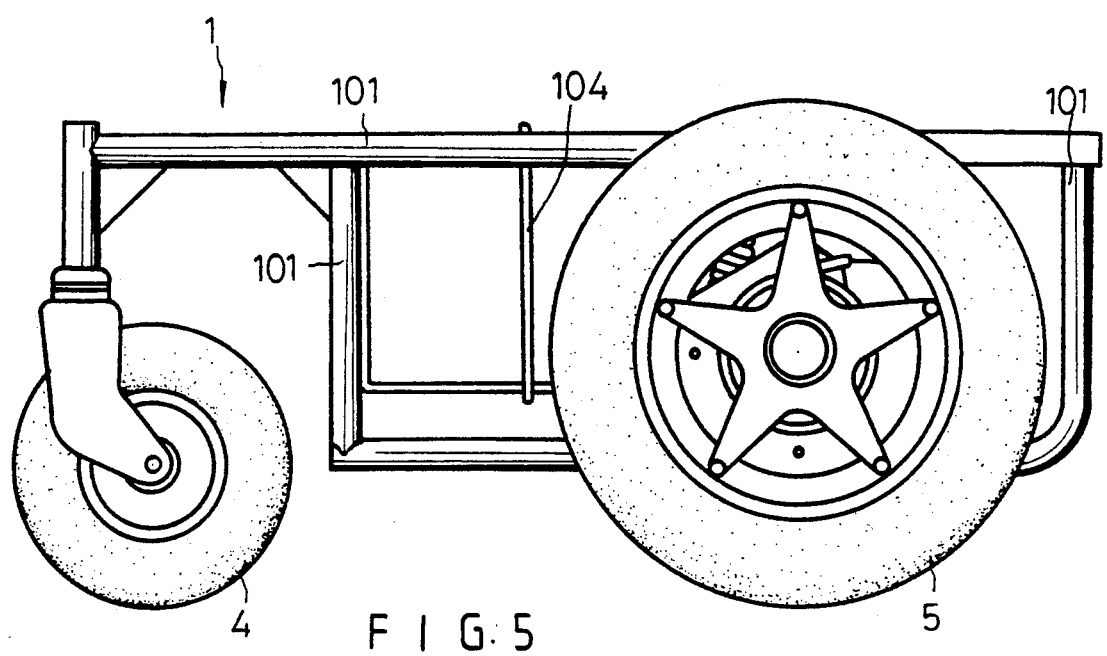
F I G. 5

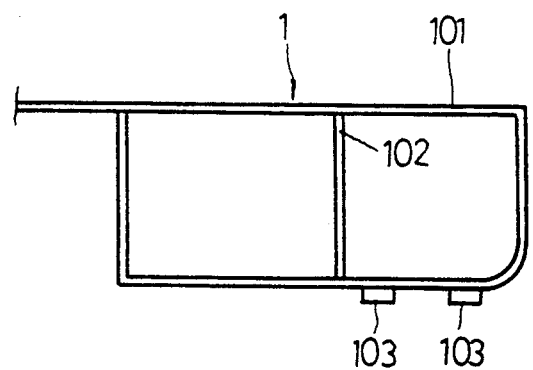
F I G. 6
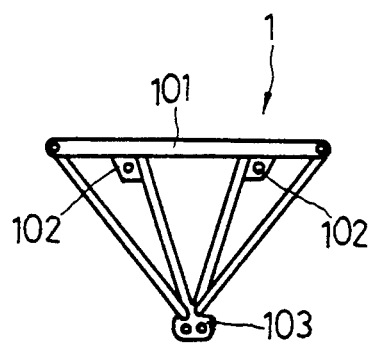
F I G. 7
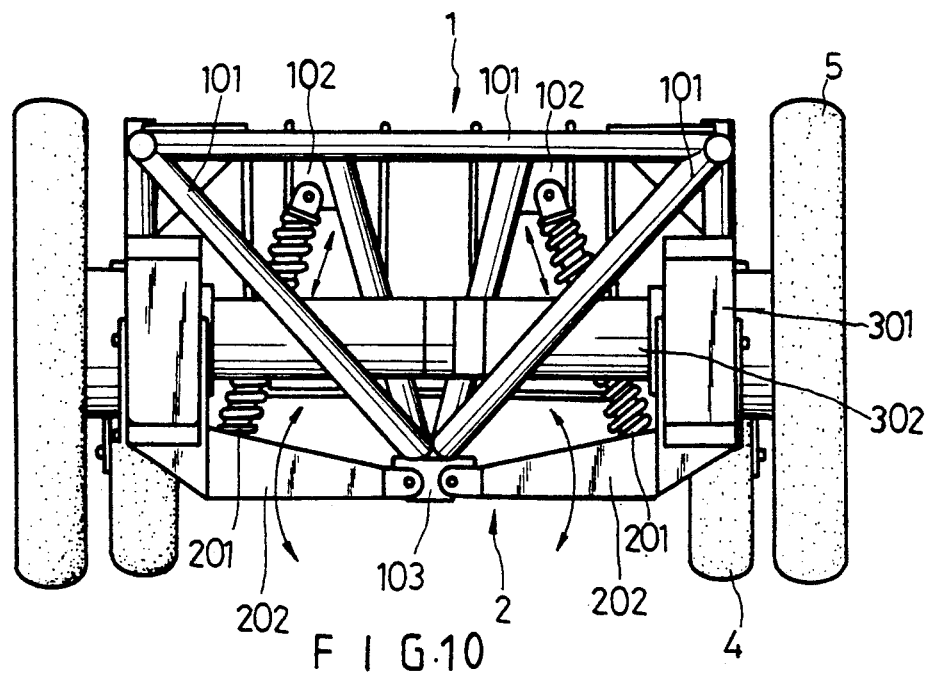
F I G. 10

WHEELED-CHAIR CHASSIS WITH A SUSPENSION MECHANISM

BACKGROUND OF THE INVENTION

Generally, the conventional wheeled chairs might be classified into two types, i.e., a three-wheel type and a four-wheel type; such wheeled chairs may also be classified into a non-shock-absorber type and a shock-absorber type. Usually, the chair has steel pipe structure and a transmission system; unfortunately, they have their drawbacks in one way or the other as follows:

(1). Non-shock-absorber type: Such a wheeled chair as shown in FIG. 1 is rather popular in the market. The existing requirements for an electro-motive wheeled chair are that it should be able to drive indoors and outdoors. During the chair being driven indoors at a slow speed, the rider would feel rather comfortable because of the floor surface usually being flat and smooth. In the event of being driven outdoors, the rider might feel uncomfortable as a result of shock or shake caused by a rough road surface and a faster driving speed. Further, such a wheeled chair is rather difficult to repair in case of having trouble.

(2). The shock-absorber type: Such type as shown in FIGS. 2 and 3 is deemed a chair which has a better shock-absorbing structure. It can provide a rider with a comfortable ride upon driving outdoors; however, it has the drawbacks of having a complicated structure and a higher manufacturing cost; as shown in FIG. 2, its reinforced rods "A" would cause a higher cost and a longer assembling time; the joint assembly "D" includes many punched and pressed parts, of which the mold costs are rather high. The swinging arm "C" is too long to provide a strong support. Since the bearing block "B" is a plate type, it has a weaker supporting strength.

SUMMARY OF THE INVENTION

This invention relates to a wheeled-chair chassis with a suspension mechanism, which comprises a chassis structure, a suspension system, a transmission system and several front and rear wheels.

The prime feature of the present invention is that the steel pipe frame is an inverse triangular frame, whereby the chassis structure can have a stronger supporting strength without causing a complex structure. Since the steel pipe frame is merely a simple structure, the assembling operation for the suspension system and the transmission system becomes simple and easy.

Another feature of the present invention is that the battery is mounted in the center portion of the chassis structure so as to provide the chair with a better balance for a safe and stable driving condition.

Still another feature of the present invention is that the suspension system includes rocker arms and shock absorbers, which have a simple but strong structure so as to provide a rider with a comfortable driving outdoors, a higher safety but a low manufacturing cost.

BRIEF DESCRIPTION OF THE DRAWINGS

FIG. 4 is a perspective view of an embodiment of an electro-motive wheeled chair according to the present invention.

FIG. 5 is a side view of the embodiment shown in FIG. 4.

FIG. 6 is a side view of a steel pipe frame of the chassis according to the present invention.

FIG. 7 is a front view of the steel pipe frame of the chassis according to the present invention.

FIG. 10 is a perspective view of the present invention, showing it in operation.

DETAILED DESCRIPTION

Figure 1:
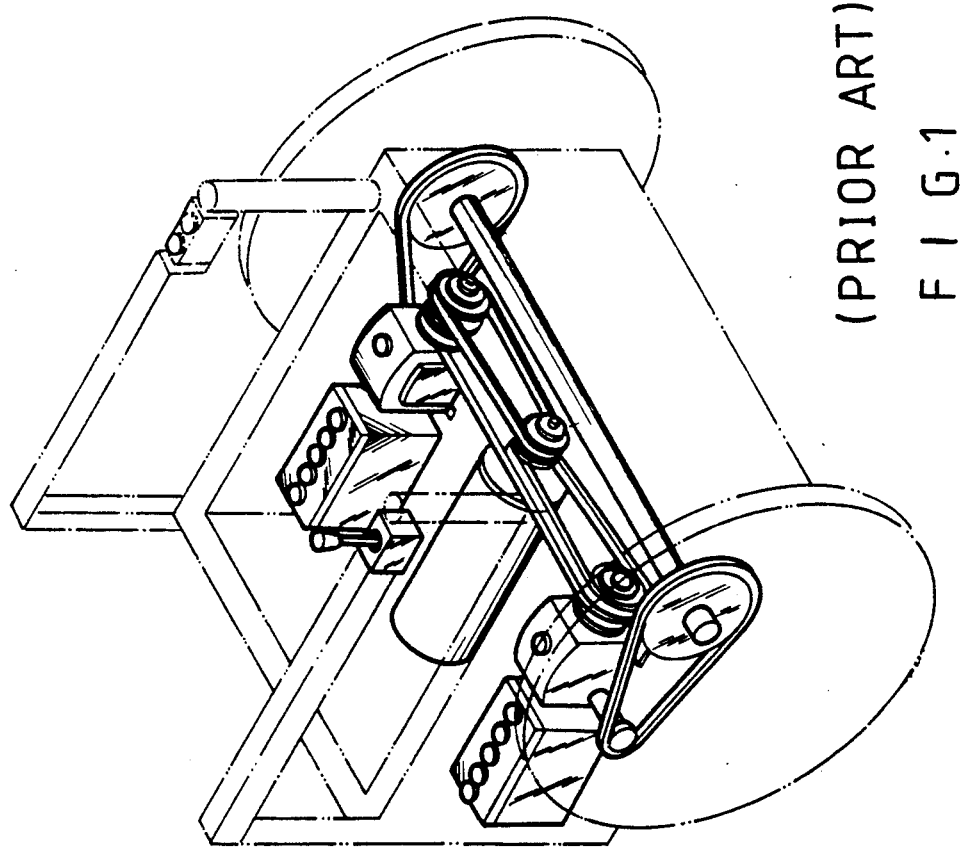
FIG. 1 is a perspective view of a conventional electromotive wheeled chair.
Figure 3:
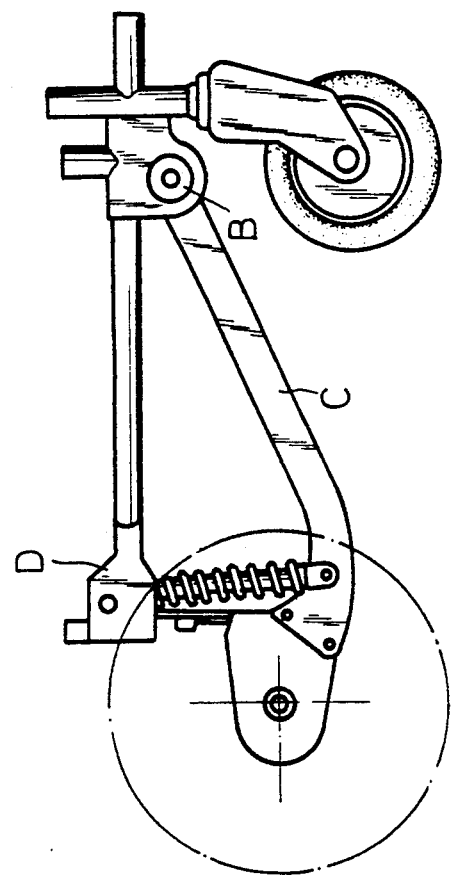
FIG. 3 is a side view of still another conventional electro-motive wheeled chair.
Figure 2:
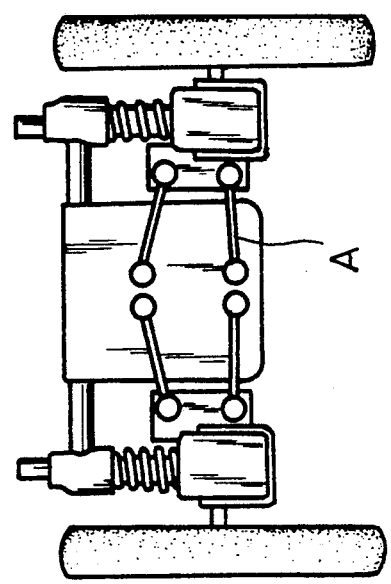
FIG. 2 is a front view of another conventional electromotive wheeled chair.
Figure 9:
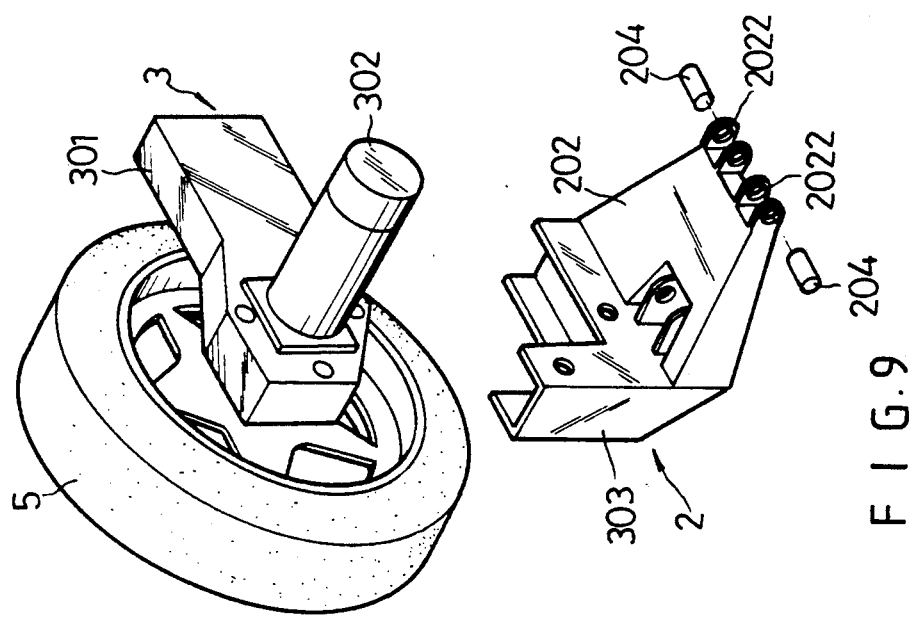
FIG. 9 is a fragmental perspective view of the transmission system and the rocker arms in the suspension system of the present invention.
Figure 8:
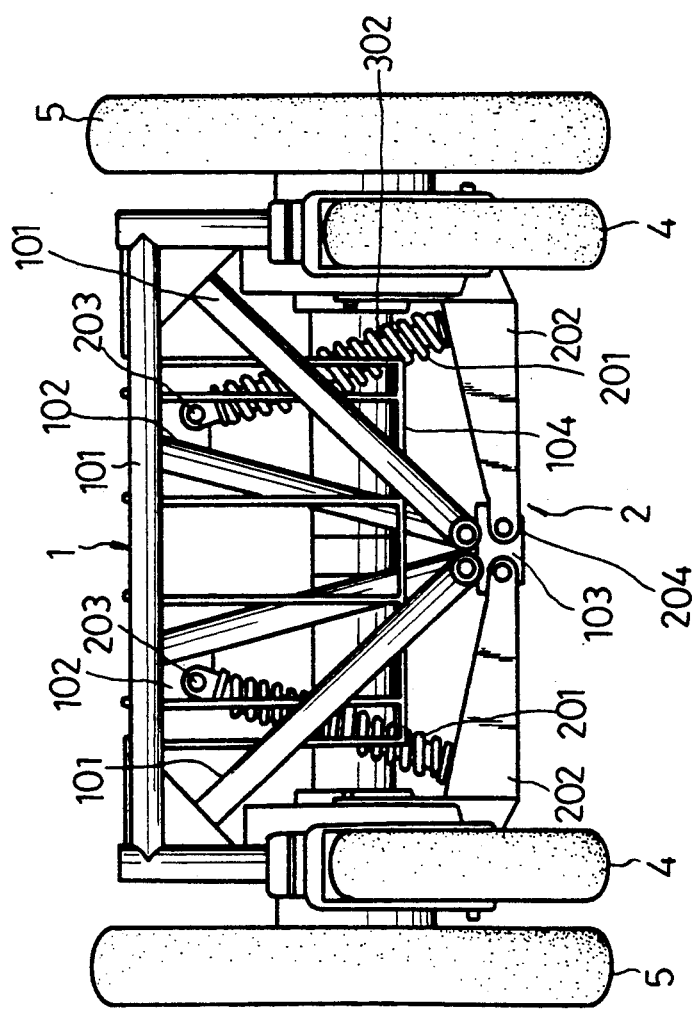
FIG. 8 is a front view of the embodiment according to the present invention.

Referring to FIGS. 4 and 5, the embodiment of the present invention is illustrated with a perspective view and a side view of the present invention, which mainly comprises a chassis structure 1, a suspension system 2, and a transmission system 3. The chassis structure 1 (as shown in FIGS. 6 and 7) includes a steel pipe frame 101, which is substantially an inverse triangular shape. The upper end of the steel pipe frame 101 has two joint bases 102, while the lower end thereof has a joint base 103 for mounting four rocker arms respectively. In front of the steel pipe frame 101, there are two front wheels 4; in the central part of the steel pipe frame 101, a battery rack 104 is installed. The suspension system 2 includes two independent assemblies, i.e., including two shocked absorbers 201, two rocker arms 202 and a plurality of pivot pins 203 and 204 (as shown in FIGS. 8 and 9). The lower end of each rocker arm 202 has two pivot bases 2022 to be connected with the joint base 103 on the lower end of the steel pipe frame 101 of the chassis structure 1 by means of a pivot pin 204. The two rocker arms 202 are pivotably connected on the left and right sides of the joint base 103 at the pivot pins 204, respectively. The upper end of each rocker arm 202 has a gear rack 303 for mounting a gear box 301 of the transmission system 3 by means of screws. The inner side of the gear box 301 is mounted with a driving motor 302, while the outer side of the gear box 301 is mounted with a rear wheel 5 through an output shaft (not shown) of the gear box 301. The parts in the transmission system 3 such as the gear box 301, the driving motor 302 and the rear wheels 5 can easily be removed or mounted on the gear rack 303 by repairman to facilitate maintenance.

FIG. 10 illustrates the operation condition of an embodiment according to the present invention; when the rear wheels 5 are driven to rotate on a rough road surface, the shake effect will be transmitted from the rear wheels 5 to the rocker arms 202; then, the retractable movement of the shock absorber 201 mounted between the shock absorber base 2021 on the rocker arm 202 and the joint base 102 on the steel pipe base 101 will absorb the shake effect of the wheeled chair caused by rough road to provide a comfortable ride for a user.

We claim:
1. A wheeled-chair chassis with a suspension mechanism comprising:
   a chassis structure made of a steel pipe frame;
   a suspension system including two shock absorbers, two rocker arms and a plurality of pivot pins;
   a transmission system including a gear rack attached to an upper end of each said rocker arm in said suspension system. a gear box mounted on said gear rack. a motor mounted on an inner side of said gear box: and characterized in that said steel pipe frame of said chassis structure is an inverse triangular frame, of which an upper end has two joint bases. while a lower end thereof has a joint base for connecting rocker arms; and a center part of said chassis structure having a battery rack; and a front part of said steel pipe frame being mounted with front wheels; and each said suspension system and said transmission system being an independent assembly; and an upper end of each said shock absorber being connected, by means of a pivot pin, with one of said joint base on said upper end of said steel pipe frame, while a lower end of said shock absorber is connected. by means of one of said pivot pin with a shock absorber base of said rocker arm; and a lower end of said rocker arm having two pivot bases for connection with said joint base on lower end of said steel pipe frame by means of one of said pivot pins; and said rear wheels being driven to move by means of said transmission system. and vibration caused by a rough road surface being transmitted from said rear wheels to said rocker arms, and a retractable movement provided with said shock absorbers between said rocker arms and said steel pipe frame for absorbing a vibration caused by a rough road surface.

* * * * *